May 10, 1938.  E. A. DICKEY  2,116,882
BRAKE SYSTEM FOR MOTOR VEHICLES
Filed Sept. 23, 1936   2 Sheets-Sheet 2
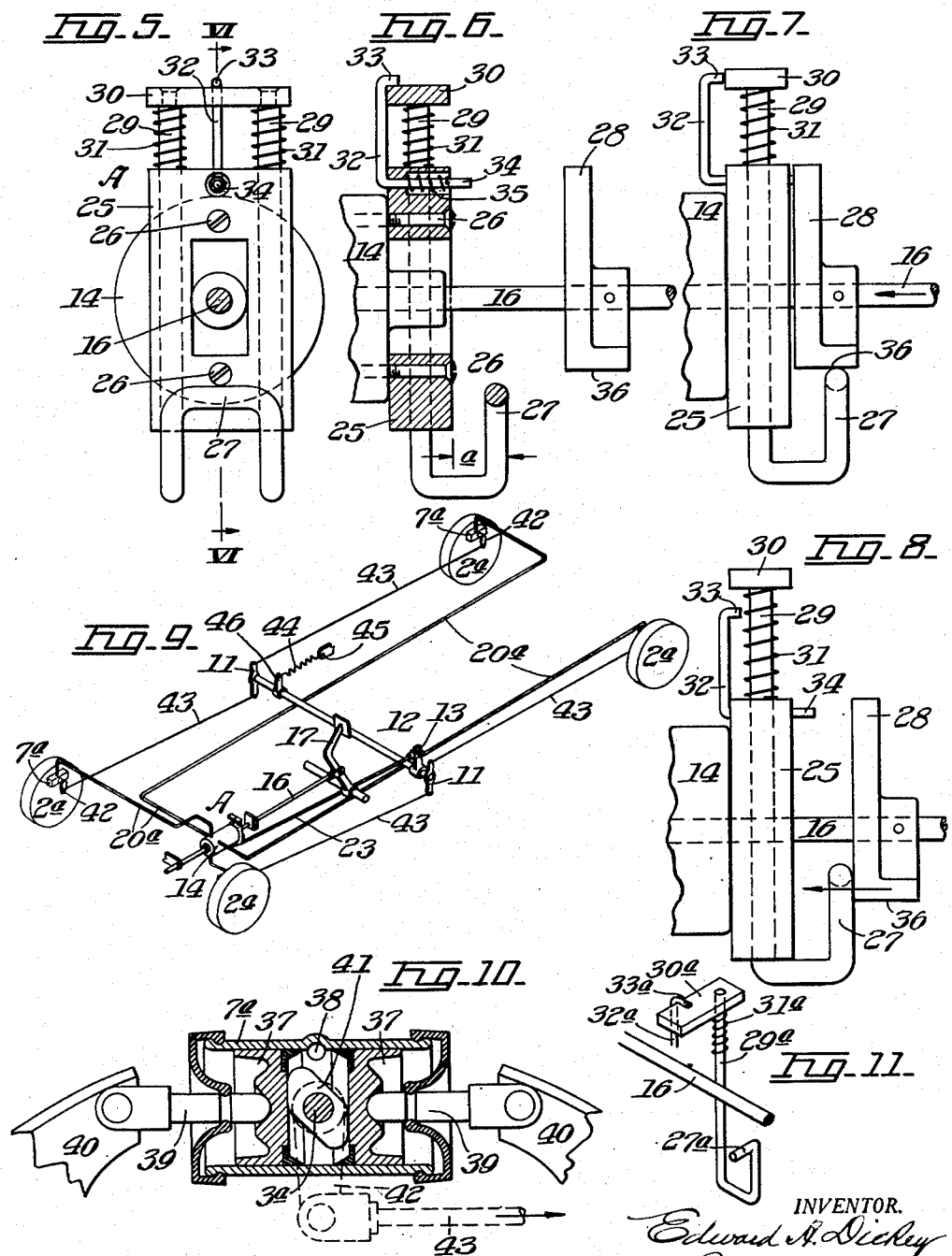
INVENTOR.
Edward A. Dickey
BY
ATTORNEY Patented May 10, 1938

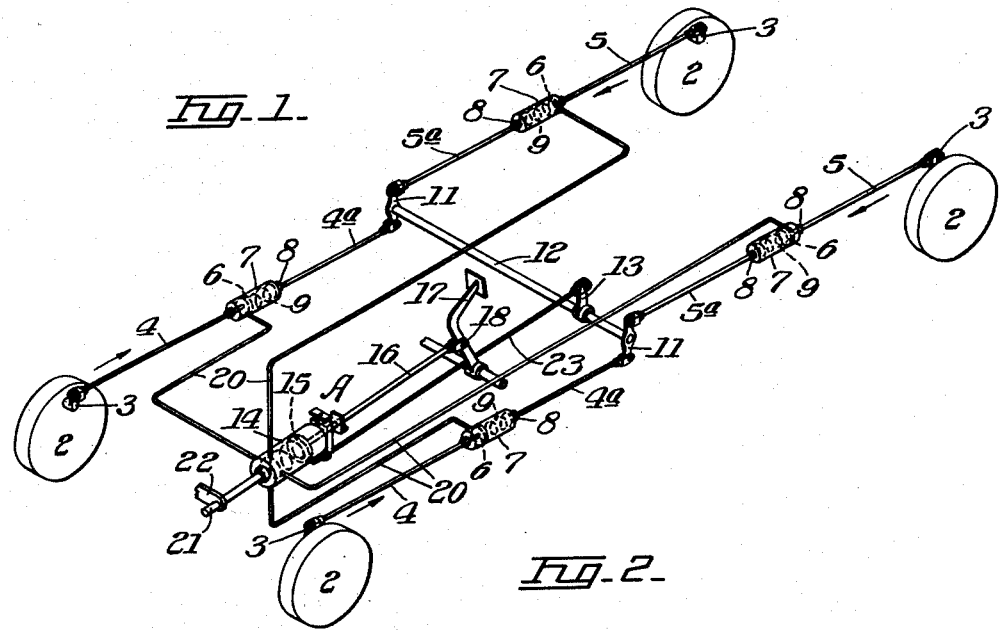
Fig. 1.
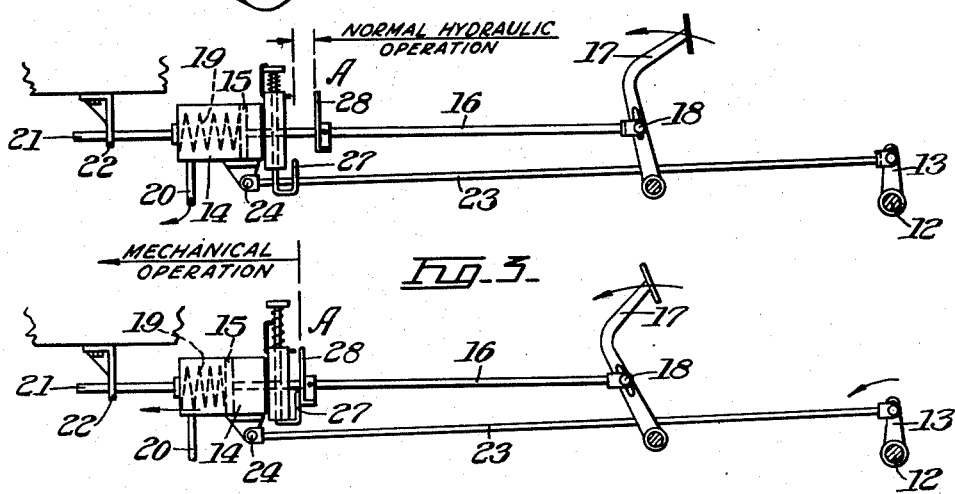
Fig. 2.
Fig. 3.
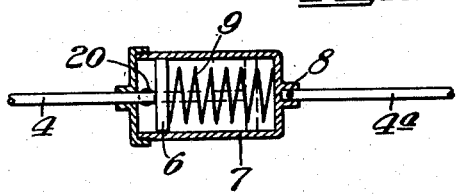
Fig. 4.

2,116,882

UNITED STATES PATENT OFFICE 2,116,882

BRAKE SYSTEM FOR MOTOR VEHICLES

Edward A. Dickey, Aliquippa, Pa.

Application September 23, 1936, Serial No. 102,122

11 Claims. (Cl. 188—152)

My invention relates to improvements in braking systems for motor vehicles, and more particularly to a combined hydraulic and mechanical braking system therefor.

Modern motor cars are equipped with either hydraulic or mechanical braking systems, both of which systems have undesirable features. For example, the mechanical system requires greater manual effort for its operation and likewise lacks automatic and positive equalization of braking power. The hydraulic system supplies the said deficiencies of the mechanical system, but is subject to complete failure upon loss of its operating fluid, as by a broken line or connection in the necessarily closed and sealed system.

It is a prime object of my invention to provide a combined hydraulic and mechanical braking system capable of alternative operation.

A further object is to provide in such a system, means for automatic actuation of the mechanical braking means upon failure of the hydraulic braking means.

A further object is to provide for the application of such a system in connection with a master cylinder for operation hydraulically or mechanically by the actuation of said master cylinder through the usual brake lever or pedal.

A still further object is to provide hydraulic braking means readily adaptable for application to present mechanical braking systems, with accompanying automatic reinstatement of the mechanical brakes upon failure of the hydraulic means.

Additional objects and advantages will become apparent from the following description, taken in connection with the accompanying drawings wherein:

Fig. 1 is a diagrammatic perspective view of an embodiment of my invention in connection with front and rear vehicle brakes;

Fig. 2 is a side elevational view of a portion of Fig. 1, showing the master cylinder with my control device and their associated connecting parts for hydraulic operation;

Fig. 3 is a view similar to Fig. 2, showing the control device in position for mechanical operation;

Fig. 4 is a sectional detail view of one of the brake rod cylinders of Fig. 1;

Fig. 5 is an end elevational view of the master cylinder showing the control device of my invention applied thereto;

Fig. 6 is a vertical sectional view taken on the line VI—VI of Fig. 5, showing the control device in position for hydraulic operation of the system, upon normal stroke;

Fig. 7 is an elevational view similar to Fig. 6, showing the control device in engagement for instituting mechanical operation of the system, upon abnormal stroke;

Fig. 8 is a view similar to Fig. 7, showing the control device in position for mechanical operation of the system, upon normal stroke;

Fig. 9 is a view similar to Fig. 1, showing a modified form of my invention;

Fig. 10 is a detail sectional view of one of the brake or wheel cylinders of Fig. 9; and Fig. 11 is an isometric view illustrating a modification of the construction of Figs. 5 to 8 inclusive.

Referring to the drawings, and particularly to Fig. 1, 2 are the usual brake drums of a four wheel motor vehicle, each having a lever-actuated rocking pin or cam shaft 3 operable to effect frictional braking resistance by tension of the pair of front connecting rods 4 and rear connecting rods 5, said parts comprising the well known mechanical brakes in general use.

For hydraulic operation of such brakes, I provide movable service or brake rod cylinders and pistons disposed in said connecting rods. As shown, the pistons 6 thereof are directly connected with the rods 4 and 5 for operation in provided cylinders 7, the latter being connected as at 8 with continuations of said rods or secondary rods 4a and 5a. 9 designates coil springs disposed in the cylinders 7 for the purpose of maintaining the respective pistons and cylinders in relatively extended position, as particularly shown in Fig. 4.

The other ends of the secondary rods 4a and 5a are secured to the opposite ends of a double acting lever 11, one at each side of the assembly, said levers being mounted on the ends of a transverse rock shaft 12 mounted in suitable bearings on the chassis frame, and having an actuating lever 13.

Located at a suitable station in the assembly is a master cylinder 14 of usual construction, including a master piston 15 and a plunger or piston rod 16 secured to the latter.

Said master cylinder is preferably positioned in advance of the standard brake pedal 17 and in proper alinement for connection of the master piston rod 16 therewith as at 18. 19 is a coil spring in the master cylinder for normally retracting the piston 15 thereof, and 20 designates a plurality of flexible tubes or conduits for fluid connection between the master cylinder and each of the brake rod cylinders 7.

The master cylinder 14 is slidably supported in position for longitudinal movement as hereinafter described, having an axial bearing rod 21 extending from the forward end thereof for support in an apertured bearing bracket 22, which latter may be fixedly secured to the chassis frame or motor block as is convenient.

Additional supports or guides (not shown) may be provided as desired, to freely support the weight of said cylinder.

A pull rod 23 is secured as at 24 to a suitable lug or extension of the master cylinder 14 and extends rearwardly for connection with the rock shaft lever 13.

The mechanical braking system thus equipped with master and rod cylinders may be hydraulically operated, the enclosed working fluid being displaced by the master piston 15 to move the service cylinder pistons 6 and the brake rods 4 and 5 in the direction of the arrows of Fig. 1. The reactive pressure on the cylinders 7 tending to produce opposite motion in the secondary rods 4a and 5a is counteracted by the pressure on the master cylinder 14, which latter reaction is transmitted to the rock shaft 12 through rod 23 and lever 13, and thereby resist counter movement in the secondary rods 4a and 5a through the double acting levers 11 of said shaft.

It will therefore be seen that the braking mechanism proper in the drums 2 will be actuated by hydraulic pressure in proportion to the manual pressure applied at the foot pedal 17.

The hydraulic means described may be readily applied to standard mechanical brakes for the purpose of converting the same to hydraulic operation.

In addition, I have provided control means for such a system whereby either hydraulic or mechanical operation may be selected as desired, said means also providing for an automatic mechanical action upon failure or disuse of the hydraulic operation.

Such means or device is generally designated A, and includes a frame or yoke member 25 secured to the master cylinder 14 in any suitable manner as by means of screws 26, said frame being preferably disposed at the end of said cylinder adjacent the foot pedal 17. Carried by the frame 25 is a movable abutment 27 mounted for movement relatively to an arm or shoe 28 fixed to and movable with the master piston rod 16. The abutment 27 functions together with the arm 28 to provide a mechanical connection between the cylinder 14 and the piston rod 16 as hereinafter set forth.

Means are provided to normally maintain the abutment 27 out of engagement with the arm 28, one form of such means being illustrated. As shown, the abutment 27 is formed by bending a rod into U-shape for spaced location with respect to the frame 25, and extends downwardly and thence upwardly by its spaced members 29 through and upwardly beyond said yoke for connection by a cross piece 30. Springs 31 between the frame and cross piece normally urge said members 29 and the abutment 27 upwardly.

An L-shaped latch 32 is slidably mounted in the frame and has a hooked terminal or detent portion 33 adapted to extend over and retain the cross piece 30 in a lowered position as in Figs. 5 and 6. The other end 34 of said latch 32 forms a trip portion projecting beyond the frame 25 in the direction of the piston rod arm 28, being normally urged to said projecting position by an attached spring 35 in a provided recess in the yoke, as clearly shown in Fig. 6.

When the cross piece 30 is latched as described, the abutment 27 is lowered below and retained out of the path of movement of the rod arm 28, coextensive with the normal hydraulic operation of the braking system, the normal travel of the piston rod 16 and its attached arm 28 during such hydraulic braking being indicated in Fig. 2.

In the event of failure of the hydraulic means, as by a broken conduit or a tubing connection, whereby the hydraulic fluid is diminished in an amount sufficient to render the system inoperative in the prescribed manner, continued movement of the foot pedal 17 will produce excessive movement of the master piston 15, due to the absence of the resistance of the said hydraulic fluid. Such excessive travel of the piston and over-travel of its rod 16 will cause the arm 28 to engage the trip end 34 of the latch 32, whereby the detent 33 thereof is disengaged from the cross piece 30 and the latter, together with the abutment 27, is moved upwardly by the springs 31, as in Fig. 7.

In the relation described, the released abutment 27 engages the under side of the rod arm 28 as at 36 in Fig. 7, thereby momentarily arresting further movement of the abutment. In such position, dependent on permissible extra movement of pedal 17, mechanical braking may be effected by direct pressure against frame 25 and master cylinder 14, by a further slight forward movement of the pedal, for immediate action.

The operator then permits the foot pedal 17 to return to normal retracted position, during which return movement, the abutment 27 moves upwardly by its springs 31 directly into the path of movement of the rod arm 28, whereby upon again depressing the foot pedal, the said arm 28 engages the abutment, as in Fig. 8.

Such further or second movement of the pedal may however be made immediately, if an initial abnormally long or further stroke beyond the Fig. 7 position is not possible. If however such abnormal single stroke is sufficient to mechanically engage and actuate the master cylinder, then upon retraction of the pedal, abutment 27 rises to the interfering position, ready for the next normal stroke operation for additional mechanical braking.

The said abutment thus constitutes a connecting link between the master cylinder 14 and the rod 16, whereby the cylinder is bodily moved in its sliding support 22 to actuate the rock shaft 12 through pull rod 23 and lever 13. Such movement causes the service pistons 6 to engage the ends of their respective cylinders 7 through the movement of double acting levers 11 and the secondary connecting rods 4a and 5a, whereby to tension the rods 4 and 5 in the proper direction to mechanically apply the wheel brakes. The position of the parts for mechanical operation is illustrated in Fig. 3 and Fig. 8.

The purpose of the abutment is to provide means between the advancing arm 28 and the master cylinder 14, normally out of range of said arm, but releasable upon a failure of hydraulic functioning and extra forward movement of the pedal to engage in front of the arm and transmit movement to the cylinder, upon excess forward movement of the rod 16.

Thus, upon failure of the hydraulic system, excessive movement of the rod 16 will cause the arm 28 to release the catch 32 and the brakes will be applied mechanically with the parts in the positions shown in Fig. 7 with the abutment still inoperative. Upon a second stroke of the pedal 17, the parts will have assumed the positions shown in Figs. 3 and 8, in which case the brakes will be applied mechanically with a smaller or normal movement of the pedal, due to the fact that the abutment 27 is now effective.

Other means may be substituted or the same modified, as in Fig. 11, utilizing a single member 29a and a shortened cross piece 30a cooperating in the same manner as above described. In such view the parts are similarly identified, with the exponent a.

It will therefore be seen that I have provided a combined braking system capable of either hydraulic or mechanical actuation, and in addition, by the provision of the control means A, I have provided an automatically operable safety feature which eliminates the hazards of failure of the hydraulic means.

The abutment 27 is preferably spaced in advance of the frame 25 a substantial distance a for the purpose of maintaining maximum leverage on the brake pedal for mechanical braking.

For this reason also, it is necessary to retract the pedal once during the change from hydraulic to mechanical operation. Such construction and operation are deemed advisable as being more readily adaptable to the pedal travel in present motor cars.

My invention may likewise be readily adapted to motor cars having standard hydraulic brake equipment, wherein the brake or service cylinders are directly associated with the brakes proper. I have illustrated the application of my invention to such a braking system in Fig. 9, wherein the brake drums 2a have service cylinders 7a, one commercial form of said cylinders being shown in detail in Fig. 10.

The mechanism thereof generally comprises a pair of oppositely movable pistons 37 adapted to be spread by the hydraulic fluid introduced therebetween as at 38, whereby to move associated plungers 39 to spread the connected brake shoes 40 outwardly into braking contact with the brake drum.

Such cylinders 7a may be connected with my master cylinder 14 by flexible conduits 20a for hydraulic operation as before.

For mechanical operation, the master cylinder 14 is connected as before with a pedal 17 and likewise the control device A is associated in the same manner with a cross shaft 12 and double acting levers 11. Also, the cylinder 14 is connected with the lever 13 of said shaft by the pull rod 23.

However, mechanical spreaders or cams 41 are mounted in the service cylinders 7a for actuating the pistons 37 thereof by attached rock shafts 3a having arms or levers 42 connected with the double acting levers 11 of the cross shaft 12, as by means of brake rods or cables 43.

During hydraulic operation, a spring 44 is preferably anchored to the frame of the vehicle as at 45, and connects an arm 46 on the shaft 12 in proper relation to resist movement of the shaft upon the application of braking pressure to the cylinder 14. Such movement of the shaft is likewise resisted by the friction in the parts.

The operation of this latter form of my invention is identical with that hereinbefore described, the control device A automatically relating the parts for mechanical operation upon failure of the hydraulic braking means.

Various changes and modifications are contemplated within the scope of the following claims.

What I claim is:

1. In a braking system for motor vehicles, a plurality of wheel brakes, a master cylinder, service cylinders for the brakes hydraulically connected with the master cylinder, a piston in said master cylinder, means for actuating said piston for hydraulic actuation of the brakes, means mechanically connecting said master cylinder with the brakes, and means associated with the master cylinder and its piston-actuating means for mechanical application of the brakes upon excessive movement of the piston actuating means.

2. In a braking system for motor vehicles, a plurality of wheel brakes, a master cylinder, service cylinders for the brakes hydraulically connected with the master cylinder, a piston in said master cylinder, means for normally actuating said piston for hydraulic actuation of the brakes, means operable by a movement of the piston-actuating means for relating said last-mentioned means and the master cylinder for combined movement upon excessive movement of the piston-actuating means, and means mechanically connecting said master cylinder with the brakes.

3. In a braking system for motor vehicles, a plurality of wheel brakes, a master cylinder, service cylinders for the brakes hydraulically connected with the master cylinder, a piston in said master cylinder, means having a predetermined movement for actuating said piston for hydraulic actuation of the brakes, means operable by an excessive movement of the actuating means for relation thereof with the master cylinder for combined movement, and means mechanically connecting said master cylinder with the brakes.

4. In a braking system for motor vehicles, a plurality of wheel brakes, a master cylinder, service cylinders for the brakes hydraulically connected with the master cylinder, a piston in said master cylinder, means for actuating said piston for hydraulic actuation of the brakes, an abutment thereon, control means carried by the master cylinder including a movable element normally retained out of engagement with said abutment, means for moving said element to relate the master piston and actuating means for combined movement, and means mechanically connecting said master cylinder with the brakes.

5. In a braking system for motor vehicles, a plurality of wheel brakes, a master cylinder, service cylinders for the brakes hydraulically connected with the master cylinder, a piston in said master cylinder, means for actuating said piston for hydraulic actuation of the brakes, an abutment thereon, control means carried by the master cylinder including a movable element normally retained out of engagement with said abutment, means operable by said abutment for moving said element to relate the master piston and actuating means for combined movement, and means mechanically connecting said master cylinder with the brakes.

6. In a braking system for motor vehicles, a plurality of wheel brakes, a master cylinder, service cylinders for the brakes hydraulically connected with the master cylinder, a piston in said master cylinder, means for actuating said piston for hydraulic actuation of the brakes, an arm movably connected with the actuating means, a control device carried by the master cylinder including a movable abutment, means engageable by the arm normally retaining said abutment out of the path of the arm on said actuating means, whereby to permit engagement by said arm of the retaining means and then of the abutment for movement of the master cylinder by the actuating means, and means mechanically connecting said master cylinder with the brakes.

7. In a braking system for motor vehicles, a plurality of wheel brakes, a master cylinder, service cylinders for the brakes hydraulically connected with the master cylinder, a piston in said master cylinder, means including a pedal for actuating the piston for hydraulic actuation of the brakes, an arm movable with said actuating means, a control device carried by the master cylinder including a spring actuated movable abutment, a latch normally retaining said abutment out of the path of the arm on said actuating means, said latch being engageable by the arm upon excessive movement thereof whereby to release the abutment for placement between the movable arm and the master cylinder, for movement of the master cylinder by the actuating means upon a second pedal stroke, and means mechanically connecting said master cylinder with the brakes.

8. In a braking system for motor vehicles, a plurality of wheel brakes, a master cylinder, service cylinders for the brakes hydraulically connected with the master cylinder, a piston in said master cylinder, means for actuating the piston for hydraulic actuation of the brakes, an arm movable with said actuating means, a control device carried by the master cylinder including a movable abutment, a latch normally retaining said abutment out of the path of the arm on said actuating means, said latch being adapted to be released by an excessive movement of the actuating means upon failure of said hydraulic means whereby to permit engagement of said arm and abutment for movement of the master cylinder by subsequent normal movement of the actuating means, and means mechanically connecting said master cylinder with the brakes.

9. In a control device for combined hydraulic and mechanical braking systems, the combination with a movable master cylinder, a piston therefor, means for actuating the piston, an arm movable with said actuating means, a movable abutment carried by the cylinder, a latch for normally retaining said abutment out of the path of the arm of said actuating means, said latch being releasable by the arm upon excessive movement thereof, a spring for moving the abutment into the path of said arm, whereby the abutment may be engaged by the arm upon a second movement of said actuating means to impart brake applying movement to the cylinder, and means mechanically connecting the master cylinder with the brake.

10. In a control device for combined hydraulic and mechanical braking systems, the combination with a movable master cylinder, a piston therefor, means for actuating the piston, an arm movable with said actuating means, a movable abutment carried by the cylinder, a latch for normally retaining said abutment out of the path of the arm of said actuating means, said latch having a trip portion engageable by an element of said actuating means on excessive movement thereof for releasing it, a spring for moving the abutment into the path of said arm whereby the abutment upon reverse and return movement of the actuating means may be engaged by the arm to impart brake applying movement to the cylinder, and means mechanically connecting the master cylinder with the brakes.

11. In a control device for combined hydraulic and mechanical braking systems, the combination with a movable master cylinder, a piston therefor, means for actuating the piston, an arm movable with said actuating means, a movable abutment carried by the cylinder, a latch for normally retaining said abutment out of the path of the arm of said actuating means, said latch having a trip portion engageable by the arm of the actuating means for releasing said latch, a spring for moving the abutment into the path of said arm, whereby the abutment may be released for engagement by the arm upon excessive movement of said actuating means and a second movement to impart brake applying movement to the cylinder, and means mechanically connecting the master cylinder with the brakes.

EDWARD A. DICKEY.